United States Patent [19]
Bailey

[11] 3,808,445
[45] Apr. 30, 1974

[54] WAVE OPERATED POWER PLANT

[76] Inventor: Wayne Bailey, c/o Wayne Bailey Enterprises, Box 89, Schaghticoke, N.Y. 12094

[22] Filed: Aug. 2, 1972

[21] Appl. No.: 278,644

[52] U.S. Cl.................................. 290/42, 290/53
[51] Int. Cl................................. F03b 13/12
[58] Field of Search............ 290/42, 43, 44, 53, 54, 290/52

[56] References Cited
UNITED STATES PATENTS

| | | | |
|---|---|---|---|
| 1,247,520 | 11/1917 | Fessenden | 290/42 |
| 2,246,472 | 6/1941 | Sharp | 290/52 |
| 3,538,340 | 11/1970 | Lang | 290/52 |
| 1,494,008 | 5/1924 | Nagler | 290/52 |
| 2,433,896 | 6/1948 | Gay | 290/52 |
| 3,153,250 | 9/1964 | Carlson | 290/52 |
| 3,523,192 | 8/1970 | Lang | 290/52 |

*Primary Examiner*—G. R. Simmons

[57] ABSTRACT

Developing and changing kinetic energy (motion) into potential dynamic energy continuously and non-poisonously, is the subject of this disclosure, particular attention being given to establishing a continuous water power producing circuit between a water source near the ground level, and a hydro-electric power plant deep down in the ground. Water rising from the deep hydro-electric power plant is pushed much higher than ground level by compressed air from which high point it falls through another hydro-electric power plant to be be returned to its water source, and repeat its performance.

1 Claim, 1 Drawing Figure

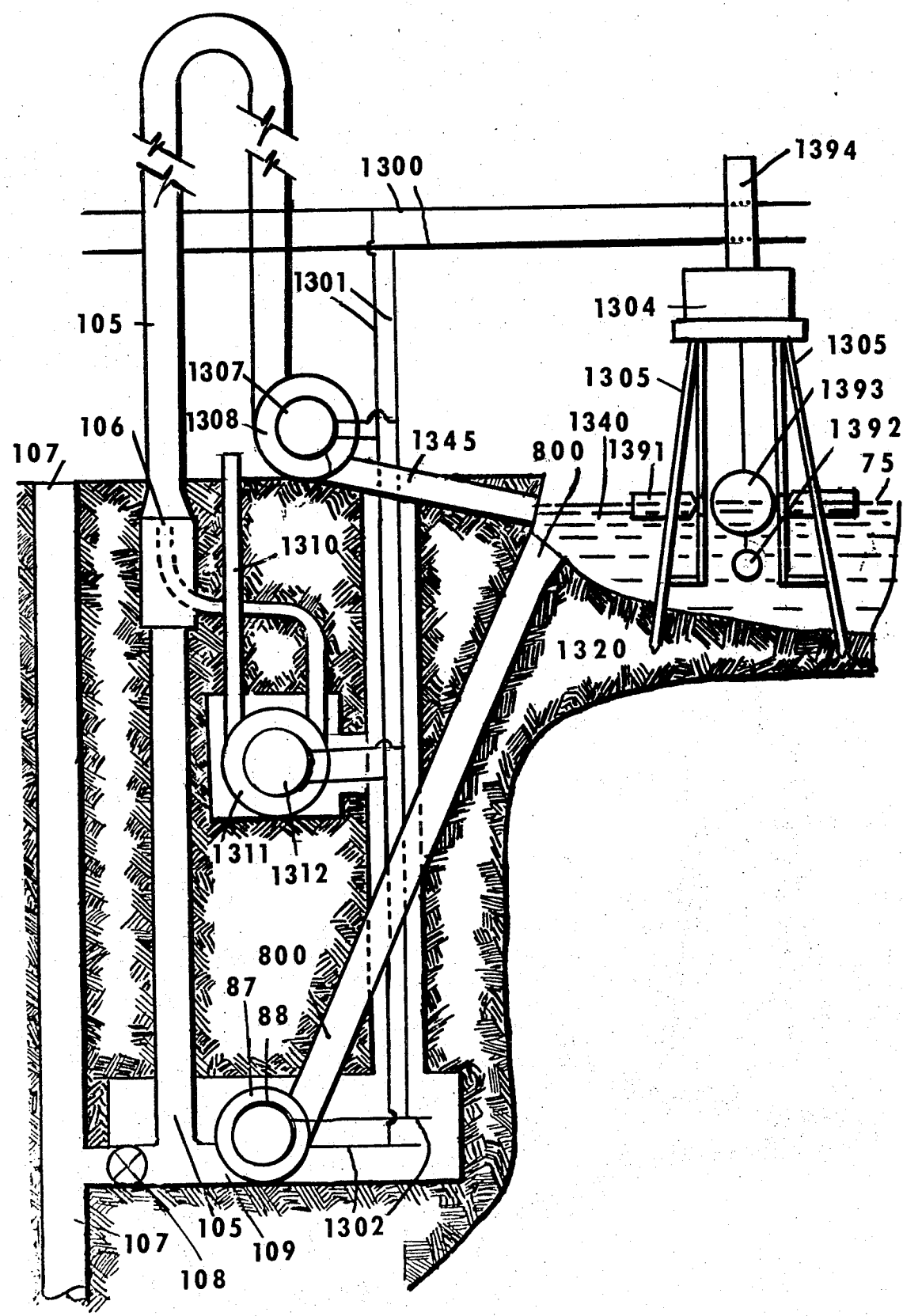

WAVE OPERATED POWER PLANT

FIG. 1 shows the type of continuous power plant described herein more specifically in the Abstract. A continuous water power producing circuit between a water source near ground level and a hydroelectric power plant deep down in the ground. Water rising from the deep hydro-electric power plant is pushed much higher than ground level by compressed air from which higher point it then falls through another hydro-electric power plant to be returned to its original water source and then repeat the same performance.

In FIG. 1 I take water from a water source 75 and drop it through a long pipe 800 into a hydraulic turbine 87. It then leaves the turbine (deeply placed down in the earth), at 109 to climb up pipe 105. The water climbing upward in tube 105 is materially assisted in its upward movement by an air blast pushing it upward at 106. This air pusher enables the water to mount to a high level and drop into water turbine 1308 and return to its original water source 75 through water outlet tube 1345.

Electric power lines 1300 are fed with electricity by power lines 1301 and 1302 receiving their electric current from electric generators 88 and 1307. Electric generator 88 is connected to and driven by water turbine 87. Electric generator 1307 is driven by water turbine 1308.. Rotary air compressor 1311 is driven by electric motor 1312 receiving its electric power off from power lines 1301 in the drawing of FIG. 1. The air intake pipe 1310 feeds air into rotary air compressor 1311 from which it leaves to arrive at air nozzel 106 where it pushes the water upwardly higher through pipe 105.

If, at any time water needs to be released from this water power producing circuit, especially to get it started . . . the release of part of the water can take place through valve 108 into water down drain pipe 107. The pipe 107 can lead to an underground cave or cavity (like a no longer oil yielding oil well),, and serve as a means of releasing a part of the water that is rushing down pipe 800 and generating water power through water turbine 87.

Off shore is elevated platform 1304 with its housing positioned on long legs 1305 on which are mounted floats 1391 and 1391 from which compressed air is being generated. These floats may be elevated or lowered to remain on the ocean surface by reason of being slidably fastened to long vertical runway members attached to platform 1304 and to long legs 1305.

Within the same long vertical members, which act as guides, long horizontal tanks 1393 ride the waves as they confer an up and down movement to these same tanks (air tight and water tight tanks) 1393. Depending from the airtanks 1393 are suitable weights 1392 1392 suitably attached to said tanks.

As the horizontal tanks 1393 move up and down with the waves, they pull (on their downward motion) on a cable which pulls a rachet that winds up a spring. The spring in house 1304 converts an intermittent motion into stored power in a coiled spring, the spring then releasing its energy (stored energy) to operate an electrical generator. This electric generator sends forth its electricity on power lines (electrical power lines) 1300 There may be several rachet arrangements pulling around several coiled springs, There may also be several electrical generators (dynamoes) operating off from these coiled springs generating considerable electric power. In any case all electric power leaves the off shore ocean tower by power lines numeral 1300.

It may be possible to substitute a water pump of the double gear type in place of the air compressor 1311, its electric motor 1312 and the compressed air nozzle 106. Such a double gear pump would be positioned in uptake pipe 105 approximately where the nozzle is now positioned, and would be driven by an electric motor receiving its power from electric lines 1301 or electric lines 1300. Such a gear pump would push the water in pipe 105 high up and around the return bend on its way to second water turbine (water turbine) 1308.

The wave motor in housing 1304 is able, as previously described, to send forth either compressed air or electric energy. This compressed air power and electricity can assist in the operation of the rest of the equipment shown here in FIG. 1.

Let it also be noted here that the coiled springs being wound up by the up and down motion of tanks 1393 can release their coiled spring energy (in housing 1304) to acuate air compressors.

While much of the electrical power developed by my way water power circuit as disclosed in FIG. 1 herein is used to keep the water circuit moving and the water continuously circulating under ground and above ground, nevertheless my general purpose is to have plenty of excess electrical power generated, particularly from generator 1307 rotatably attached to water turbine 1308, for power service to the public. Since wave motors, for example, are intermittent sources of electric power, with my coiled spring power storage, and my compressed air power storage and my continuous power circuit with water power developed underground and above ground, I am changing intermittent power flow to continuous power flow. By these means and methods herein illustrated and described, I show and explain how this change from intermittent to continuous power can best be effected, leaving plenty of electricity on high lines 1300 for public distribution and use.

I claim:

1. A fueless power plant comprising a water source, a water turbine deep in the ground connected to said water source by a water intake pipe and receiving water through said pipe from said water source to provide hydro power, an electric generator rotatively attached to said water turbine positioned deep in the ground, a water outlet pipe for receiving water from said deep down turbine, a valve in said water outlet pipe, a water disposal pipe connected to said valved water outlet pipe, a water outlet uptake pipe connected to said deep down turbine for directing water upward from said deep down water turbine, a compressed air nozzle positioned in said water uptake pipe to push water higher in said uptake pipe, an air compressor connected to supply compressed air to said compressed air nozzle, an electric motor driving said air compressor, an extension of said water uptake pipe to a return pipe bend in said uptake pipe located above said compressed air nozzle, and above the water level of said water source, a second water turbine connected by a pipe to said return bend and to said water intake side of said second water turbine, an electric generator driven by said second water turbine, a water outake pipe for returning water from said second turbine to said water source, a fueless power plant producing electricity, and electric power lines interconnecting all of said electric generators and said electric motors.

* * * * *